United States Patent
Higuchi

(10) Patent No.: US 6,421,210 B1
(45) Date of Patent: Jul. 16, 2002

(54) MECHANISM FOR PREVENTING PROPAGATION OF DRIVING MOTOR NOISE AND VIBRATION ON A TAPE DECK, AND TAPE DECK HAVING THE SAME

(75) Inventor: Takeshi Higuchi, Tsuyama (JP)

(73) Assignee: Funai Electric Co., Ltd. (JP)

( * ) Notice: Subject to any disclaimer, the term of this patent is extended or adjusted under 35 U.S.C. 154(b) by 0 days.

(21) Appl. No.: 09/560,726

(22) Filed: Apr. 28, 2000

(30) Foreign Application Priority Data

May 24, 1999 (JP) .......................................... 11-003540
Oct. 7, 1999 (JP) .......................................... 11-007647

(51) Int. Cl.$^7$ .............................................. G11B 15/61
(52) U.S. Cl. ..................................................... 360/271
(58) Field of Search ............................. 360/271, 271.1, 360/96.1, 96.2, 96.3, 96.4, 95

(56) References Cited

U.S. PATENT DOCUMENTS 3,881,188 A * 4/1975 Zenzefilis .................... 360/97
5,729,407 A * 3/1998 Koh et al. ................... 360/107
5,936,793 A * 8/1999 Koh et al. ................... 360/85
6,147,833 A * 11/2000 Watanabe ................. 360/96.1

FOREIGN PATENT DOCUMENTS

JP 061785520 6/1994
JP 06187693 7/1994

* cited by examiner

Primary Examiner—William Korzuch
Assistant Examiner—Christopher R Beacham
(74) Attorney, Agent, or Firm—Morrison Law Firm

(57) ABSTRACT

A direct driving motor for a videotape deck, in which a motor shaft is directly coupled to the capstan axis, and which is controlled by a PWM control, has a constitution in which a stator core and a deck chassis or a head cylinder are electrically insulated with each other. Also, the motor includes a bearing holder for holding a motor PCB (printed circuit board) one end of which is supported on the deck chassis in an insulating state. This constitution prevents current switching noise generating in the motor from propagating into the deck chassis, thereby suppressing video screen noise and audio noise, and also provides a measure for suppressing motor vibration.

10 Claims, 5 Drawing Sheets

MECHANISM FOR PREVENTING PROPAGATION OF DRIVING MOTOR NOISE AND VIBRATION ON A TAPE DECK, AND TAPE DECK HAVING THE SAME

BACKGROUND OF THE INVENTION

This invention relates generally to a mechanism for suppressing capstan driving motor noise and vibration on a videotape deck. Particularly, the invention relates to an art for preventing switching noise, caused by a switching control (e.g., a pulse width modulation (PWM) control) of a direct driving motor current in which a motor shaft is directly coupled to a capstan axis, from affecting images.

Conventionally, as to a capstan driving motor for a videotape deck, a method of full-wave or half-wave current linear driving is generally adopted. However, in order to achieve power-saving, high resistance to voltage, speed-up and suppression of heating, rather than this kind of the driving motor, it has been known to use a direct driving motor [an] output shaft of which can be directly connected to a capstan axis, and which is controlled by PWM the method. As disclosed in a publication of unexamined Japanese Utility Model Application No. 59-117284, said direct driving motor controlled by the PWM method is structured by a rotatable rotor provided with a 9 ring-shaped magnet, and a stator core facing to the magnet of said rotor and having a driving coil. Although this shows a brushless motor facing to a surface of the magnet, this structure can also be applied to a brushless motor facing to a periphery of the magnet.

However, the above-mentioned PWM direct driving motor gives the driving coil higher voltage than the motor of the linear driving method does, and intermits (perform switching to) its current, as shown in FIG. 7, so that harmonics elements generate in a rising edge and a falling edge of the rectangular current. The harmonics elements become large switching noise, and the current containing the noise is induced on the stator core. In this state, since the motor is mounted on a deck chassis as an electrically conducting material in a conducting state, the current containing the noise is propagated to the deck chassis, and then, it is propagated through the deck chassis to the cylinder drum having a head, then further propagated to a video circuit and an audio circuit. Thus, the switching noise, which also contains frequency elements of a video band and a sound band, causes video screen noise (jitter) or audio noise. That is, the PWM direct driving motor gives the high frequency noise to the head amplifier and the like, which makes an unbearable state for watching and listening.

SUMMARY OF THE INVENTION

This invention is made to solve the above-mentioned problems. The first object of the present invention is to provide a mechanism for avoiding propagation of driving motor noise and vibration on a tape deck, which, by using a direct driving motor controlled by the PWM method for driving a capstan, prevents switching noise of said motor from propagating to a cylinder head drum, a video circuit and an audio circuit, thereby suppressing the video screen noise and audio noise.

Further, when the direct driving motor controlled by PWM method is mounted on the deck chassis by using an insulating material such as resin in order to suppress said noise, the vibration of the motor may be propagated to the deck chassis, which causes vibration resonant sound, or increases screen jitter. The second object of the present invention is to provide a mechanism for preventing propagation of driving motor noise and vibration on a tape deck, which can resolve the problem caused by said vibration.

In order to achieve the above-mentioned objects, according to one aspect of the present invention, a mechanism for preventing propagation of driving motor noise on a tape deck comprises a deck chassis, a pinch roller and a capstan axis for conveying a tape, a motor which is mounted on said deck chassis for driving said capstan axis, and a cylinder drum which is mounted on said deck chassis and provided with a head for magnetic-recording and playing for the tape: wherein said motor is a direct driving motor in which a motor shaft is directly coupled to the capstan axis, and which is controlled by switching; and, wherein said motor is electrically insulated from said deck chassis.

In the above-mentioned constitution, when the direct driving motor is controlled by switching, current of comparatively high voltage is intermitted, so that switching noise containing harmonics elements generates in the stator core of said motor. However, the motor and deck chassis are electrically insulated from each other, which prevents the switching noise from propagating to the deck chassis, and further avoids it from propagating to the cylinder drum, a video circuit and an audio circuit. Therefore, this constitution makes it possible to suppress video screen noise and audio noise.

In the above-mentioned constitution, the direct driving motor is mounted on the deck chassis through an insulator.

Further, in the above-mentioned constitution, said direct driving motor comprises a rotational axis as a capstan axis, a rotor which is mounted on said rotational axis, a stator core which is wound by a coil being supplied PWM control current and faces to said rotor, and a bearing holder which holds said stator core and supports said rotational axis, and said direct driving motor is mounted through said bearing holder on the deck chassis, wherein said bearing holder is made of an insulating material. If resin is used as the bearing holder, for example, this constitution prevents the switching noise from propagating to the deck chassis in a comparatively simple structure.

In the above-mentioned constitution, said cylinder drum can be mounted on the deck chassis through an insulator.

According to another aspect of the present invention, a mechanism for preventing propagation of driving motor noise on a tape deck comprising a deck chassis, a pinch roller and a capstan axis for conveying a tape, a motor which is mounted on said deck chassis for driving said capstan axis, and a cylinder drum which is mounted on said deck chassis and provided with a head for magnetic-recording and playing for the tape: wherein said motor is a direct driving motor in which a motor shaft is directly coupled to the capstan axis, and which is controlled by switching; and, wherein said motor comprises a rotational axis as a capstan axis, a rotor which is mounted in said rotational axis, a stator core which is wound by a coil being supplied switching control current and faces to said rotor, a bearing holder which is made of an insulating material for holding said stator core and supporting said rotational axis, and a motor PCB (printed circuit board) which is supported by said bearing holder and on which circuit elements for controlling the motor are mounted, and wherein said motor is secured on the deck chassis through the bearing holder; and, wherein said motor PCB is held in close to where the bearing holder is mounted on the deck chassis, and supported by a supporting member in an electrically insulating state at a distance from where the motor PCB is held.

In the above-mentioned constitution, the direct driving motor controlled by a switching control is mounted on the deck chassis by using the bearing holder made of an insulating material such as resin. Although vibration caused by a decrease in mechanical securing strength of said motor in an activation thereof may propagate to the deck chassis, the motor PCB is held by the bearing holder, and besides, supported by the supporting member in the electrically insulating state from the deck chassis. Accordingly, this constitution prevents generation of vibration resonant sound and increase of screen jitter.

In the above-mentioned constitution, the supporting member can be composed of a boss made of resin which is provided extending toward the motor PCB on the deck chassis. Further, the supporting member can be an extending part of an insulating holder for holding members mounted on the deck chassis. Furthermore, the supporting member can be composed of a projection formed on the deck chassis, and an insulating material intervened between said projection and the motor PCB.

DETAILED DESCRIPTION OF THE
PREFERRED EMBODIMENT OF THE PRESENT
INVENTION

Figure 1:
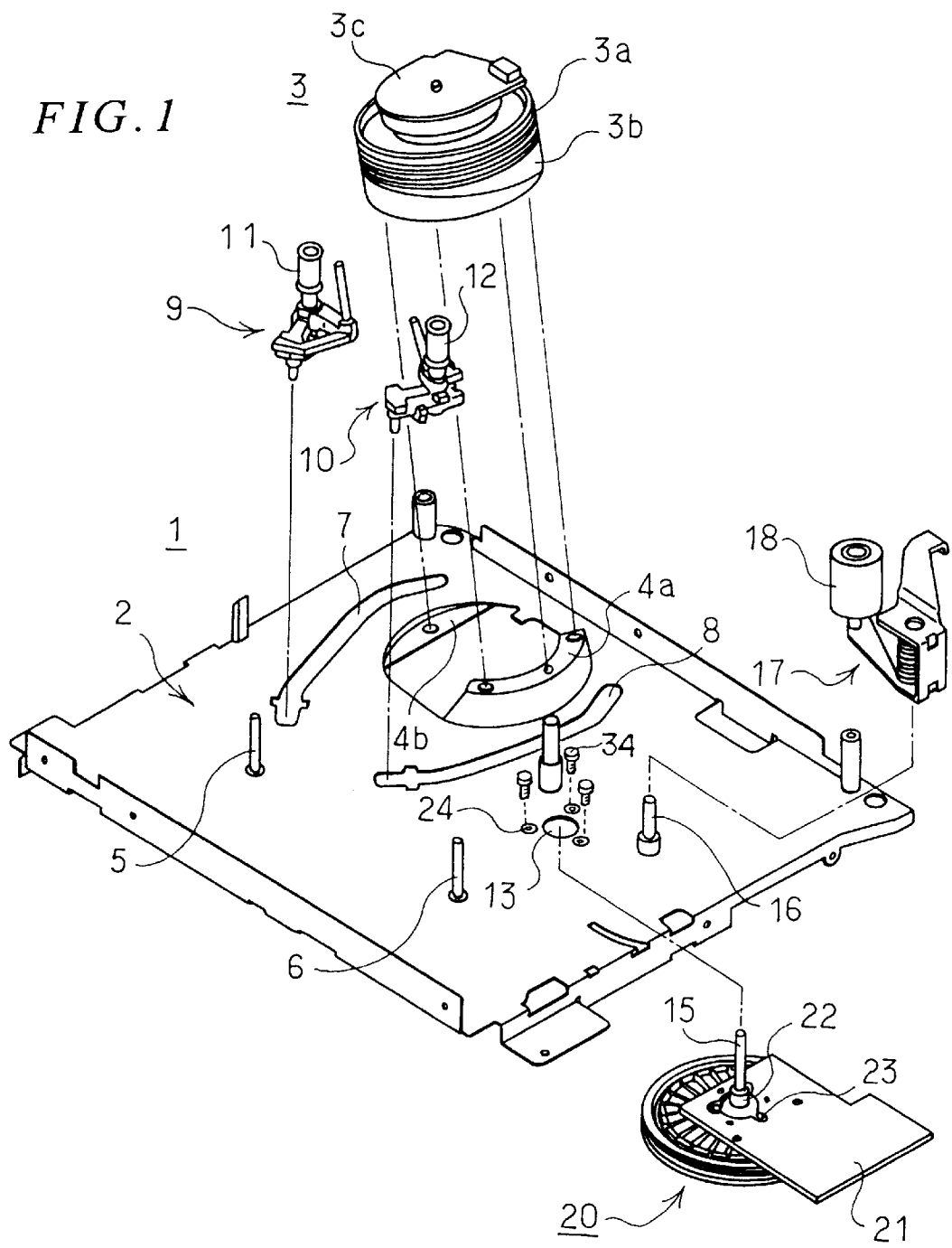
FIG. 1 is an exploded perspective view showing a constitution of a deck chassis of a videotape deck according to a first embodiment of the present invention.

Now, a mechanism for preventing propagation of driving motor noise on a tape deck according to the first embodiment of the present invention will be explained with reference to the drawings. FIG. 1 shows a schematic constitution of a deck chassis in a videotape deck 1. In the figure, the videotape deck 1 is equipped with a rotatable head cylinder 3 (cylinder drum), a supply reel axis 5, a take-up reel axis 6 and tape loading pins 11 and 12 on the deck chassis 2. Said head cylinder 3 has a recording and playing head. Said supply reel axis 5 and take-up reel axis 6 engage with and support a tape reel in a cassette (not shown in the figure). Said tape loading pins 11 and 12 are mounted on sliders 9 and 10 which are slid through long-hole rails 7 and 8 in order for the tape supplied from the tape reel to be reeled on the head cylinder 3. Further, the deck chassis 2 has an opening 13 for a capstan, through which a capstan axis 15 is stuck out. A pinch roller assembly 17, which is supported by a supporting axis 16, is provided with a pinch roller 18. The capstan axis 15 and pinch roller 18 pinch the tape therebetween so as to convey it.

Said head cylinder 3 includes a rotatable cylinder 3a which has the recording and playing head, and includes a fixed cylinder 3b which has a boss for supporting a pivot of the rotatable cylinder 3a. The rotatable cylinder 3a is driven to rotate by a driving motor 3c which is fixed on the top end of said pivot. The deck chassis 2 has tilted mounts 4a and 4b on which the fixed cylinder 3b is secured by screw fasteners. Accordingly, the head cylinder 3 is mounted in at a predetermined angle for helical scanning. A head circuit board is secured on the fixed axis of the fixed cylinder 3b. The fixed cylinder 3b, which is desired to be electrically grounded, is mounted on the deck chassis 2 in a conducting state.

The capstan axis 15 is composed of a rotational axis of a pulse width modulation (PWM) direct driving motor 20 (hereinafter referred to as PWM motor). Said motor 20 has a motor printed circuit board (PCB) 21, and a bearing holder 22 for holding the capstan axis 15. The motor 20 is secured on the deck chassis 2 by screwing screw fasteners 34 through small holes 24 of the deck chassis 2 into three screw holes 23 which are provided on the bearing holder 22 on a surface touching the deck chassis 2. Further, a video PCB (later described), a sound head, an eraser head and other members (not shown in the figure) are also mounted on the deck chassis 2.

Figure 2A:
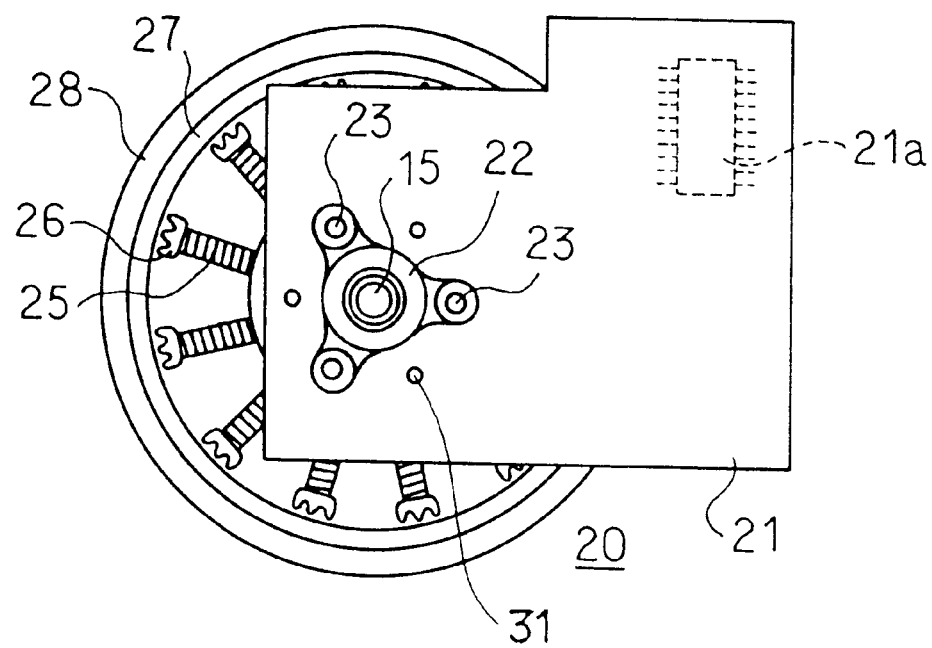
FIG. 2(a) is a top view of a PWM driving motor of the present invention.
Figure 2B:
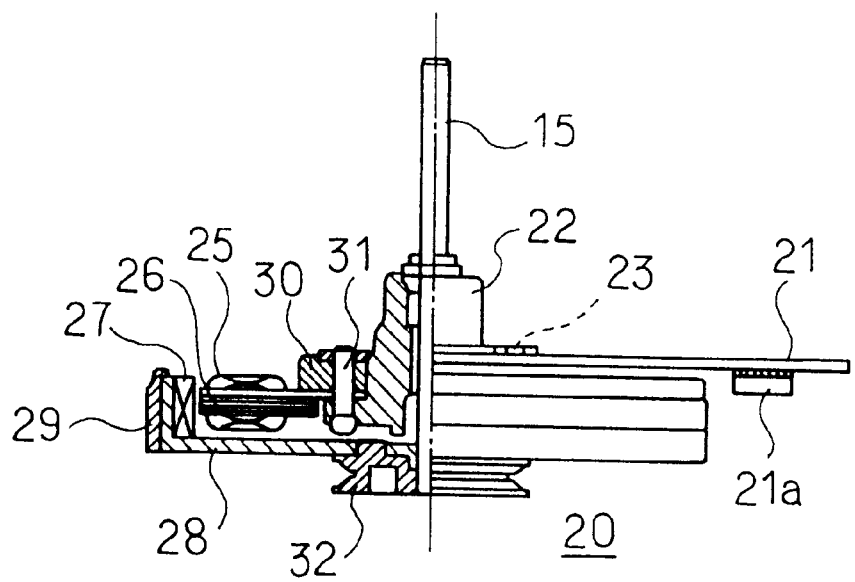
FIG. 2(b) is a front view in half section of said motor.

FIGS. 2(a) and 2(b) show a constitution of the PWM motor 20. As shown in the figure, said motor 20 comprises stator cores 26, a driving magnet 27, a rotor yoke 28 and a core holder 30. The stator core 26, around which a coil 25 being supplied the PWM control current is wound, is constituted by a laminated silicon steel sheet. The driving magnet 27 is composed of ferrite shaped like a ring, and the like, which constitutes a rotor toward a periphery of the core 26. The rotor yoke 28 is composed of iron and the like for supporting the magnet 27. The core holder 30 holds the stator core. The stator core 26 is unitedly fixed on the bearing holder 22 with the motor PCB 21 on which a driver IC (integrated circuit) 21a and the like for controlling said motor are mounted, through the core holder 30 by a tightening member 31. The rotor yoke 28 is secured on the capstan axis 15 in a yoke hub passage. The rotor yoke 28 is provided with a pulley 32 for looping a belt, and a yoke periphery rubber 29 magnetized for detecting rotational speed.

Figure 3:
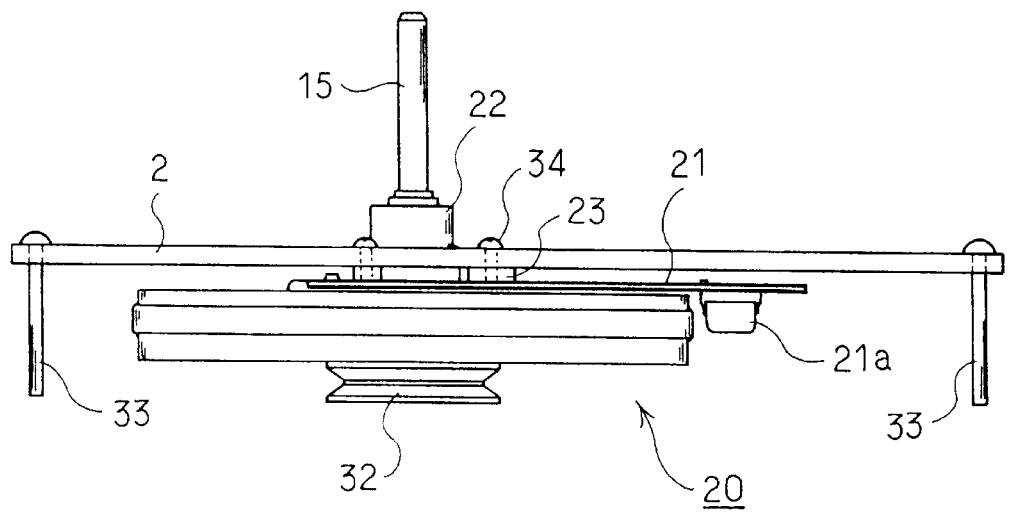
FIG. 3 is a side view showing the PWM motor integrated into the deck chassis.

FIG. 3 shows the deck chassis 2 into which the PWM motor 20 is integrated. The motor 20 is integrated into the deck chassis 2 via the bearing holder 22, and the motor PCB 21 is held by the bearing holder 22. Accordingly, the motor 20 and the motor PCB 21 are mounted at a distance from the deck chassis 2. The deck chassis 2 is loaded into a frame at corners by columns 33.

In this state, the PWM motor 20 electrically insulates at least between the stator core 26 and the deck chassis 2 or head cylinder 3 by using an insulating material such as resin in the tightening parts of the bearing holder 22 or screw fasteners 34.

Figure 4:
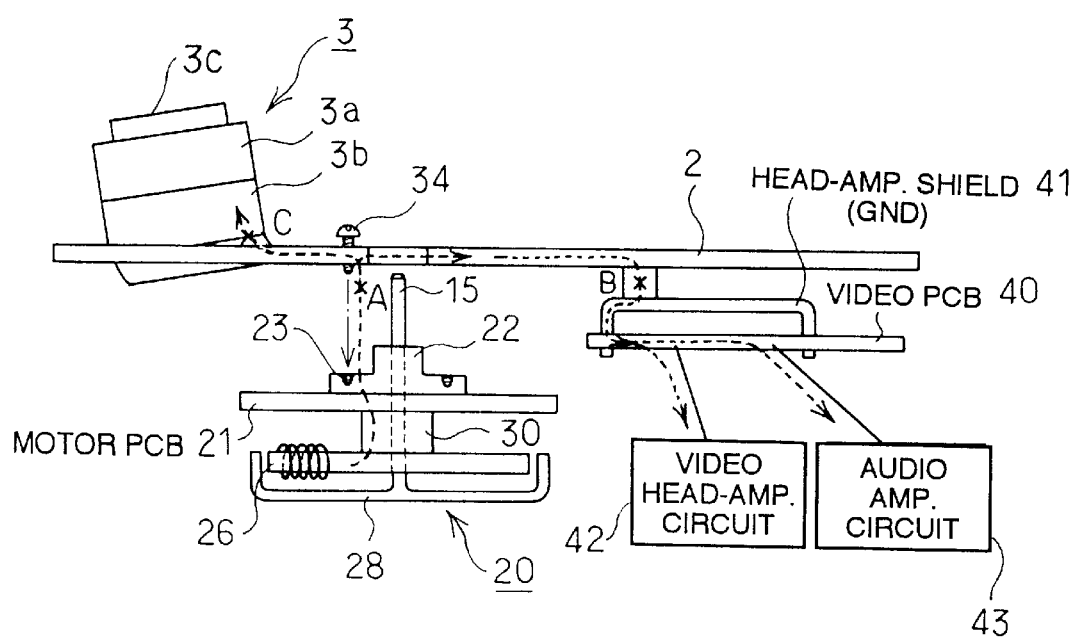
FIG. 4 is a view explaining a constitution in which an electrical insulation is made between a stator core and the deck chassis or a head cylinder.

Next, referring to FIG. 4, the explanation is given to an effect of the constitution in which the stator core 26, and the deck chassis 2 or head cylinder 3 are electrically insulated as mentioned above. FIG. 4 is a schematic view of the above-mentioned constitution. The deck chassis 2 makes a connection to a video PCB 40 through a head-amplifier shield 41 (GND). The video PCB 40 includes a video head-amplifier circuit 42 and an audio amplifier circuit 43 both of which have to be grounded, so that they are connected to the deck chassis 2 in an electrically conducting state. Dashed-line arrows in the figure show propagation paths of electronic current of switching noise which is induced by the stator core 26. It is possible to prevent the switching noise from propagating to the head cylinder 3, video head-amplifier circuit 42, or audio amplifier circuit 43 by cutting the path at a point A, B or C. However, it is less desirable to cut the path at the point B or C in the light of performance of each circuit located prior to them.

It is desirable to cut the path at the point A. Resin is employed as the bearing holder 22 in the present embodiment. Otherwise, rather than the resin bearing holder 22, it is also possible to employ resin as the screw fasteners 34, and have an insulating sheet intervene between the deck chassis 2 and bearing holder 22. This constitution, using the comparatively simple constitution, makes it possible to prevent - the switching noise containing harmonics elements which generate in an activation of the PWM motor 20 from propagating to the deck chassis 2 and head cylinder 3, and further makes it possible to avoid it from propagating to the video head-amplifier circuit 42 or audio amplifier circuit 43. Therefore, this resolves a problem of noise on a video screen, or a problem of audio noise.

Moreover, the constitution in which the video amplifier circuit is contained in the head cylinder 3 eliminates the need for grounding the head cylinder 3 on the deck chassis 2. Consequently, in such a case, there is no need to electrically insulate between the stator core 26 of the PWM motor 20 and the deck chassis 2, and what is required is to electrically insulate between the stator core 26 (i.e., deck chassis 2) and the head cylinder 3 by using a resin spacer as the tilted mounts 4a and 4b on which head cylinder 3 is mounted (in this case, the path is cut at the point C).

Figure 5:
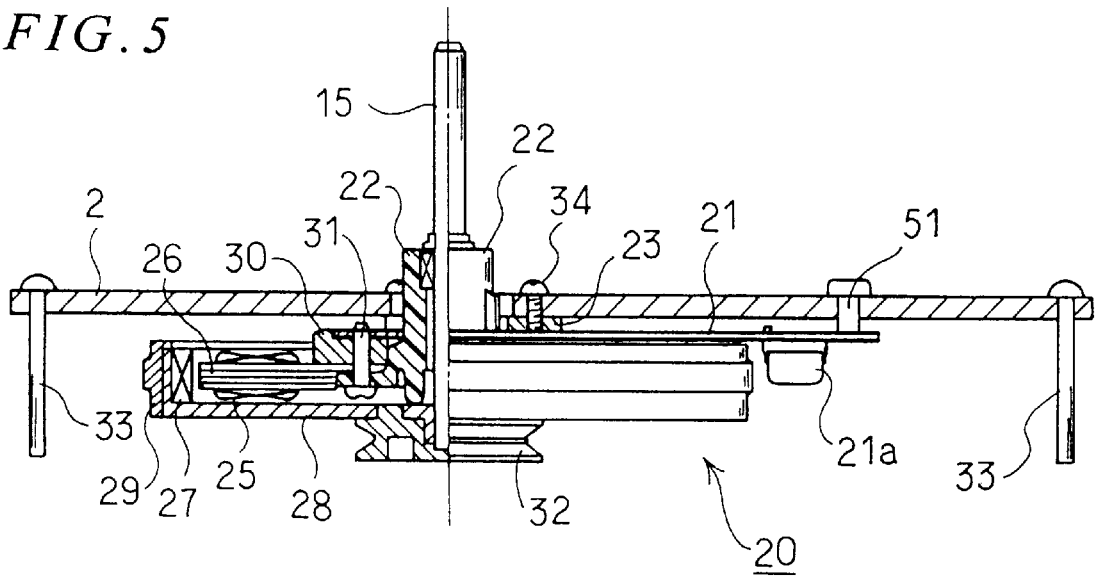
FIG. 5 is a view in half section of the videotape deck according to a second embodiment of the present invention.

FIG. 5 shows a videotape deck according to the second embodiment of the present invention, and a half section of the deck chassis 2 into which a PWM direct driving motor 20 is integrated. As is the case with the first embodiment, if the PWM motor 20 is secured on the deck chassis 2 by using the insulating material such as resin for electrical insulation, its mechanical securing strength is prone to decrease, so that vibration generating in the activation of the PWM motor 20 may propagate to and resonate the deck chassis 2. Therefore, measures to deal with the vibration are added in the second embodiment. As shown in FIG. 5, the PWM motor 20 and motor PCB 21 are mounted through the bearing holder 22 to the deck chassis 2. Further, the motor PCB 21 is mechanically supported by a supporting member 51 at a part away from the bearing holder 22 mounted in the deck chassis 2 in a state of electrically insulating to the deck chassis 2. That is, the motor PCB 21 is held in close to where the bearing holder 22 is mounted on the deck chassis 2, and besides, it is also supported at the end part thereof at a distance from the bearing holder 22 in an electrically insulating state from the deck chassis 2.

In the present embodiment, the supporting member 51 is structured by a boss formed of a resin, which is mounted on the deck chassis 2 toward the motor PCB 21. The end of the boss is desired to be fixed or adhered to the motor PCB 21 at its contacting surface by using an adhesive. Thus, the constitution of supporting the motor PCB 21 as mentioned above can prevent the vibration generating in the activation of the PWM motor 20 from propagating to the deck chassis 2. Concerning the resin-formed boss, the member which is formed by outsert molding in the deck chassis 2 is also applicable. As to the position supported by the supporting member 51, it is more desirable to distance it from the supporting position by the bearing holder 22 of the motor PCB 21 as much as possible in order to increase an effect of suppressing the vibration. It is also applicable to engage one end of the motor PCB 21 with a recessed part of the resin-formed boss.

Said supporting member 51 can be an extended part of an insulating holder for holding gear-related components which each exerts their actions of the tape deck mounted on the deck chassis 2. Also, the supporting member 51 can be some shock absorbing material or vibration absorbing material such as insulating rubber.

Figure 6:
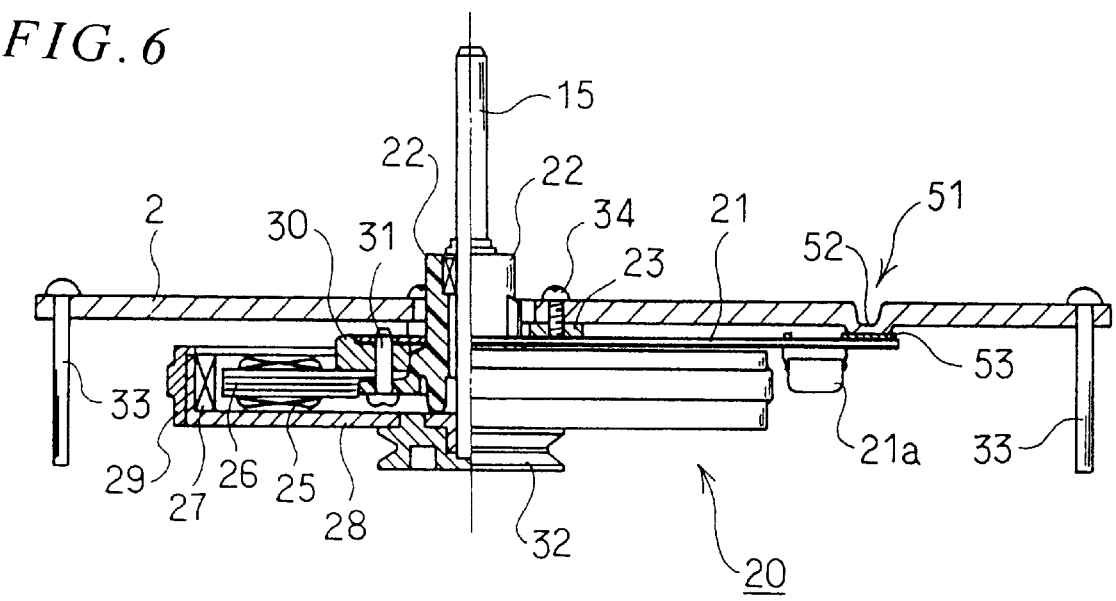
FIG. 6 is a view in half section of the videotape deck according to a modified embodiment of the second embodiment of the present invention.
Figure 7:
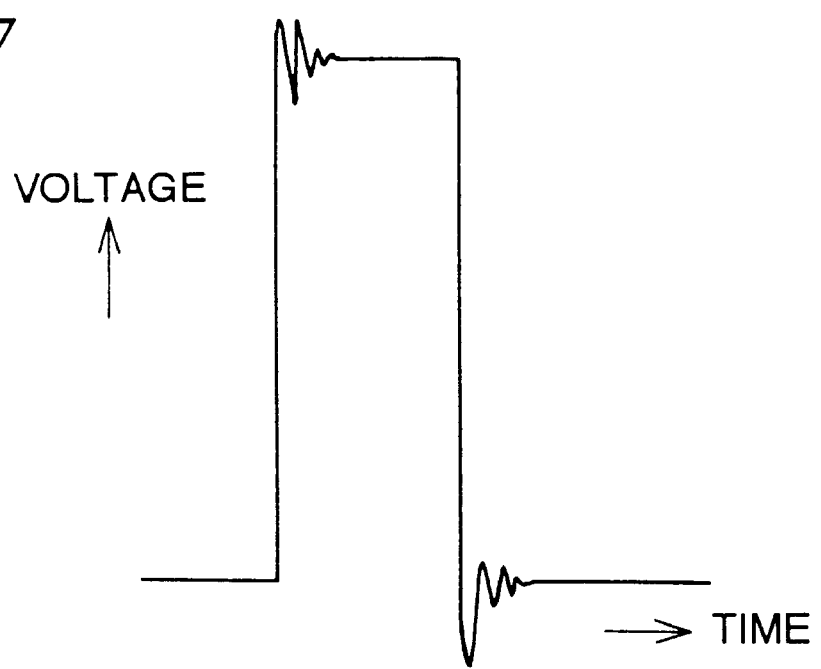
FIG. 7 is a view showing harmonics elements generating in a rising edge and a falling edge of a rectangular current.

FIG. 6 shows a modified embodiment of the second embodiment. In this embodiment, the supporting member 51 is comprised of a projection 52 which is formed in the deck chassis 2 by drawing processing, and an insulating sheet material 53 (e.g., vinyl chloride) which is intervened between the projection 52 and motor PCB 21. The projection 52, and insulating sheet 53, and the insulating sheet 53 and motor PCB 21 are adhered to each other on their contacting surfaces. Instead of the insulating sheet 53, an insulating coating film can be formed on a contacting surface of the motor PCB 21 and projection 52. The constitutions of above-described second embodiment and the modified embodiment thereof suppress the vibration of the motor PCB 21 caused by the vibration generating in the activation of the PWM motor 20. Accordingly, this prevents the vibration from propagating to the deck chassis 2, which suppresses vibration resonant noise and avoids image jitter from generating.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. For example, the above embodiment shows the constitution in which electrical insulation is given between the stator core of the PWM direct driving motor and deck chassis, or between the stator core and cylinder drum, but the electrical insulation can be given to both of them. Further, an insulating structure other than the above-described constitution can also be applied.

What is claimed is:

1. A mechanism for preventing propagation of driving motor noise and vibration on a tape deck, comprising:
   a deck chassis, a pinch roller and a capstan axis for conveying a tape, a motor which is mounted on said deck chassis for driving said capstan axis, a cylinder drum which is mounted on said deck chassis and provided with a head for magnetic-recording and playing on the tape;
   said motor being a direct driving motor in which a motor shaft is directly coupled to the capstan axis, and which is controlled by current switching;
   said motor being electrically insulated from said deck chassis;
   said direct driving motor controlled by a pulse width modulation (PWM) control; and
   said direct driving motor including a rotational axis as a capstan axis, a rotor which is mounted on said rotational axis, a stator core which is wounded by a coil being supplied PWM control current and faces to said rotor, and a bearing holder which holds said stator core and supports said rotational axis, and said direct driving motor is mounted through said bearing holder on the deck chassis;
   wherein said bearing holder is made of an insulating material.

2. The mechanism for preventing propagation of driving motor noise and vibration on a tape deck according to claim 1, wherein said direct driving motor is mounted on said deck chassis through an insulating material.

3. The mechanism for preventing propagation of driving motor noise and vibration on a tape deck according to claim 1, wherein said cylinder drum is mounted on said deck chassis through an insulator.

4. A tape deck which comprises the mechanism for controlling driving motor noise and vibration on a tape deck according to claim 1.

5. A mechanism for preventing propagation of driving motor noise and vibration on a tape deck comprising a deck chassis, a pinch roller and a capstan axis for conveying a tape, a motor which is mounted on said deck chassis for driving said capstan axis, and a cylinder drum which is mounted on said deck chassis and provided with a head for magnetic-recording and playing on the tape:

wherein said motor is a direct driving motor in which a motor shaft is directly coupled to the capstan axis, and which is controlled by current switching;

wherein said motor comprises a rotational axis as a capstan axis, a rotor which is mounted in said rotational axis, a stator core which is wound by a coil being supplied switching control current and faces to said rotor, a bearing holder which is made of an insulating material for holding said stator core and supporting said rotational axis, and a motor PCB (printed circuit board) which is supported by said bearing holder and on which circuit elements for controlling the motor are mounted, and wherein said motor is secured on the deck chassis through the bearing holder; and, wherein said motor PCB is held in close to where the bearing holder is mounted on the deck chassis, and supported by a supporting member in an electrically insulating state at a distance from where the motor PCB is held.

6. The mechanism for preventing propagation of driving motor noise and vibration on a tape deck according to claim 5, wherein said direct driving motor is controlled by a pulse width modulation (PWM) control.

7. The mechanism for preventing propagation of driving motor noise and vibration on a tape deck according to claim 6, wherein said supporting member is composed of a projection which is provided toward the motor PCB on said deck chassis and made of an insulating material.

8. The mechanism for preventing propagation of driving motor noise and vibration on a tape deck according to claim 6, wherein said supporting member is an extended part of an insulating holder for holding members which are mounted on said deck chassis.

9. The mechanism for preventing propagation of driving motor noise and vibration on a tape deck according to claim 6, wherein said supporting member is composed of a projection formed on the deck chassis, and an insulating material intervened between said projection and said motor PCB.

10. A tape deck which is provided with the mechanism which suppresses driving motor noise and vibration on a tape deck according to claim 6.

* * * * *